Patented July 28, 1936

2,048,823

UNITED STATES PATENT OFFICE 2,048,823

ANTIOXIDANT

Waldo L. Semon, Silver Lake Village, Ohio, assignor to The B. F. Goodrich Company, New York, N. Y., a corporation of New York No Drawing. Original application June 2, 1933, Serial No. 674,042. Divided and this application May 22, 1935, Serial No. 22,815

12 Claims. (Cl. 18—50)

This invention relates to the art of preserving rubber, synthetic plastics, fatty oils, petroleum products, and like organic materials against unduly rapid deterioration due to oxidation and the like.

This invention, in brief, consists in treating the rubber or other like organic material with a member of a class of compounds which may be designated as nuclear hydrocarbon substituted diaryl p-phenylene diamines. They have the general structural formula $$R_1-NH-R_2-NH-R_3$$

wherein $R_1$ and $R_3$ are aromatic nuclei and $R_2$ is a para phenylene group which contains at least one hydrocarbon substituent such as an alkyl, cycloalkyl or aryl group.

For example, the following compounds are typical members of the class of anti-oxidants described above: 2,5 dianilino toluene; 2,5 di(p-tolylamino) toluene; 2,5 di(alpha-naphthylamino) toluene; 2,5 di(beta-naphthylamino) toluene; 2,5 dianilino cumene; 1,4 dianilino 2,6 xylene; 2,5 dianilino biphenyl; 2,5 di(naphthylamino) biphenyl; 2,5 dianilino cyclohexyl benzene; etc. Any of the above-enumerated compounds may be used with good effect to retard the deterioration of rubber or other like organic substances, preferably in moderately small proportions, say from 0.1 to 5 per cent.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 part. One portion of this composition is used as a control, while another portion is further mixed with 0.96 part by weight (0.5% of the composition) of 2.5 dianilino toluene. After vulcanization in a press for 45 minutes at 294° F. to produce an optimum cure, it is found that the composition containing the anti-oxidant deteriorates only approximately half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta-percha, rubber isomers, and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed without departing from the spirit and scope of the invention as defined in the appended claims.

This application is a division of my co-pending application Serial No. 674,042 filed June 2, 1933, which is in turn a continuation in part of my application Serial No. 281,585 filed May 29, 1928, now Patent No. 1,940,815.

I claim:

1. The method of preserving rubber which comprises treating rubber with a diaryl p-phenylene diamine wherein the phenylene nucleus contains a hydrocarbon substituent.

2. The method of preserving rubber which comprises treating rubber with a diaryl p-phenylene diamine wherein the phenylene nucleus contains a monovalent cyclic hydrocarbon substituent.

3. The method of preserving rubber which comprises treating rubber with 2,5 dianilino biphenyl.

4. The method of preserving rubber which comprises treating rubber with 2,5 dianilino cyclohexyl benzene.

5. The method of preserving rubber which comprises treating rubber with a diaryl p-phenylene diamine wherein the phenylene nucleus contains an alkyl substituent.

6. The method of preserving rubber which comprises treating rubber with 2,5 dianilino toluene.

7. A composition comprising rubber and a diaryl p-phenylene diamine wherein the phenylene nucleus contains a hydrocarbon substituent.

8. A composition comprising rubber and a diaryl p-phenylene diamine wherein the phenylene nucleus contains a monovalent cyclic hydrocarbon substituent.

9. A composition comprising rubber and 2,5 dianilino biphenyl.

10. A composition comprising rubber and 2,5 dianilino cyclohexyl benzene.

11. A composition comprising rubber and a diaryl p-phenylene diamine wherein the phenylene nucleus contains an alkyl substituent.

12. A composition comprising rubber and 2,5 dianilino toluene.

WALDO L. SEMON.